United States Patent
Ota et al.

(10) Patent No.: US 10,618,148 B2
(45) Date of Patent: Apr. 14, 2020

(54) SCREW CUTTING MECHANISM FOR SCREW FEEDER

(71) Applicant: OHTAKE ROOT KOGYO CO., LTD., Ichinoseki-shi, Iwate (JP)

(72) Inventors: Yoshitake Ota, Ichinoseki (JP); Hirofumi Oikawa, Ichinoseki (JP)

(73) Assignee: OHTAKE ROOT KOGYO CO., LTD., Ichinoseki-shi, Iwate (JP)

( * ) Notice: Subject to any disclaimer, the term of this patent is extended or adjusted under 35 U.S.C. 154(b) by 0 days.

(21) Appl. No.: 15/321,807

(22) PCT Filed: Aug. 20, 2014

(86) PCT No.: PCT/JP2014/071730
§ 371 (c)(1),
(2) Date: Dec. 23, 2016

(87) PCT Pub. No.: WO2016/002094
PCT Pub. Date: Jan. 7, 2016

(65) Prior Publication Data
US 2017/0129079 A1    May 11, 2017

(30) Foreign Application Priority Data
Jul. 2, 2014 (JP) ................. 2014-136993

(51) Int. Cl.
*B65B 23/04* (2006.01)
*B23P 19/00* (2006.01)
(Continued)

(52) U.S. Cl.
CPC .......... *B25B 23/045* (2013.01); *B23P 19/001* (2013.01); *B23P 19/003* (2013.01); *B23P 19/06* (2013.01); *B65G 47/846* (2013.01)

(58) Field of Classification Search
CPC ...... B23P 19/001; B23P 19/06; B25B 23/045; B65G 47/14; B65D 83/0454; G07F 11/005; G07F 11/56
See application file for complete search history.

(56) References Cited

U.S. PATENT DOCUMENTS 2,864,286 A * 12/1958 Rawson ................. H01M 6/08
493/103
3,354,512 A * 11/1967 Fleming .............. A61F 13/2082
19/145.3
(Continued)

FOREIGN PATENT DOCUMENTS

JP    60-143663 U     9/1985
JP    05-345251 A    12/1993
(Continued)

OTHER PUBLICATIONS

International Search Report of PCT/JP2014/071730 dated Sep. 22, 2014.

*Primary Examiner* — Gene O Crawford
*Assistant Examiner* — Kelvin L Randall, Jr.
(74) *Attorney, Agent, or Firm* — Sughrue Mion, PLLC

(57) ABSTRACT

[Problem] To provide a screw cutting mechanism that can stably feed screws to a driver bit by stabilizing the position of the screws, and that has an accurate and smooth cutting action.
[Solution] Provided is a screw cutting mechanism for cutting screws one at a time from a screw feeder, wherein: the cutting mechanism is equipped with a rotating disk that rotates horizontally; the outer circumference of the rotating disk comprises a recessed section that opens toward the axis of rotation and holds the screws therein; the rotating disk fits into a circular cavity in the upper section on the frame side; a rotating shaft attaches the rotating disk to the upper section on the frame side, is equipped with a fixed bearing section (Continued)

in the middle section on the frame side, and is equipped with an adjustable bearing section that can be secured to the lower section on the frame body side so that the attachment position is adjustable; a slit disk, which is equipped with a slit that corresponds to the recessed section, and a drive gear are fixed at suitable locations on the rotating shaft between the adjustable bearing section and the rotating disk; a detection mechanism for detecting the slit of the slit disk is provided; a stepping motor is controlled by a detection signal from the detection mechanism to drive the drive gear; and the rotating disk is rotated by a prescribed angle in one direction.

4 Claims, 7 Drawing Sheets

(51) Int. Cl.
  *B25B 23/04* (2006.01)
  *B23P 19/06* (2006.01)
  *B65G 47/84* (2006.01)

(56) References Cited

U.S. PATENT DOCUMENTS

| | | | |
|---|---|---|---|
| 3,622,039 A * | 11/1971 | Lindstrom | B23P 19/08 221/10 |
| 3,914,814 A * | 10/1975 | Beissner | B23P 19/08 470/50 |
| 4,498,234 A * | 2/1985 | Greslin | B23P 19/001 29/785 |
| 4,511,058 A * | 4/1985 | Carminati | B23P 19/001 193/38 |
| 4,610,008 A * | 9/1986 | Ishibashi | G11B 17/22 221/14 |
| 4,616,577 A * | 10/1986 | van der Lely | A01C 7/105 111/178 |
| 4,746,210 A * | 5/1988 | DiFoggio | B04B 5/0421 356/23 |
| 7,964,142 B2 * | 6/2011 | Mototsu | G01N 35/00 324/71.1 |
| 8,950,625 B2 * | 2/2015 | Brug | B65H 3/00 221/231 |
| 2005/0024644 A1 * | 2/2005 | Mototsu | G01N 35/00 356/436 |
| 2013/0255451 A1 * | 10/2013 | Teng | B23P 19/06 81/430 |
| 2015/0063956 A1 * | 3/2015 | King | G07F 11/24 414/226.05 |

FOREIGN PATENT DOCUMENTS

| | | |
|---|---|---|
| JP | 08-155758 A | 6/1996 |
| JP | 08-290337 A | 11/1996 |
| JP | 11-15667 A | 1/1999 |
| JP | 2011-208852 A | 10/2011 |
| JP | 2011-224712 A | 11/2011 |
| WO | 2008/062535 A1 | 5/2008 |

* cited by examiner

[FIG. 1]
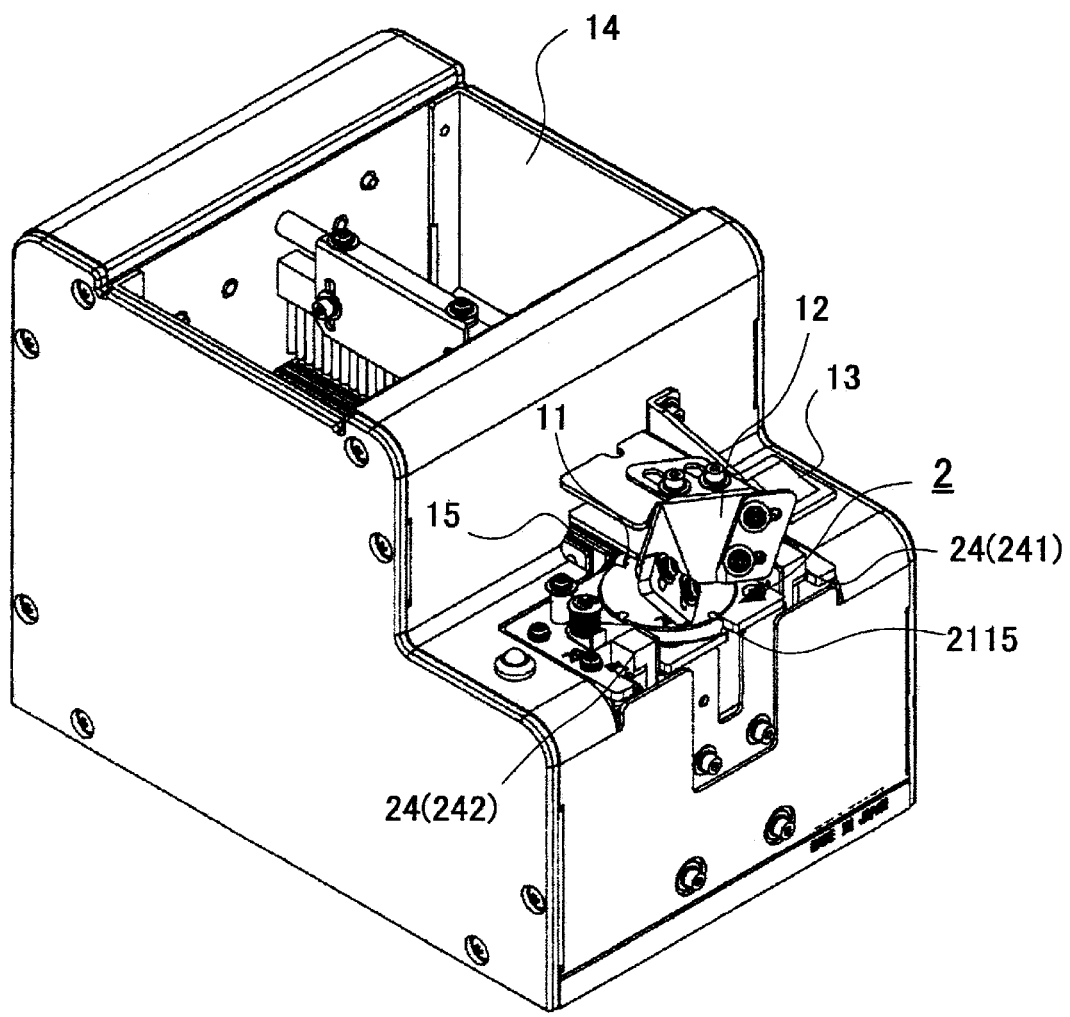

[FIG. 2]
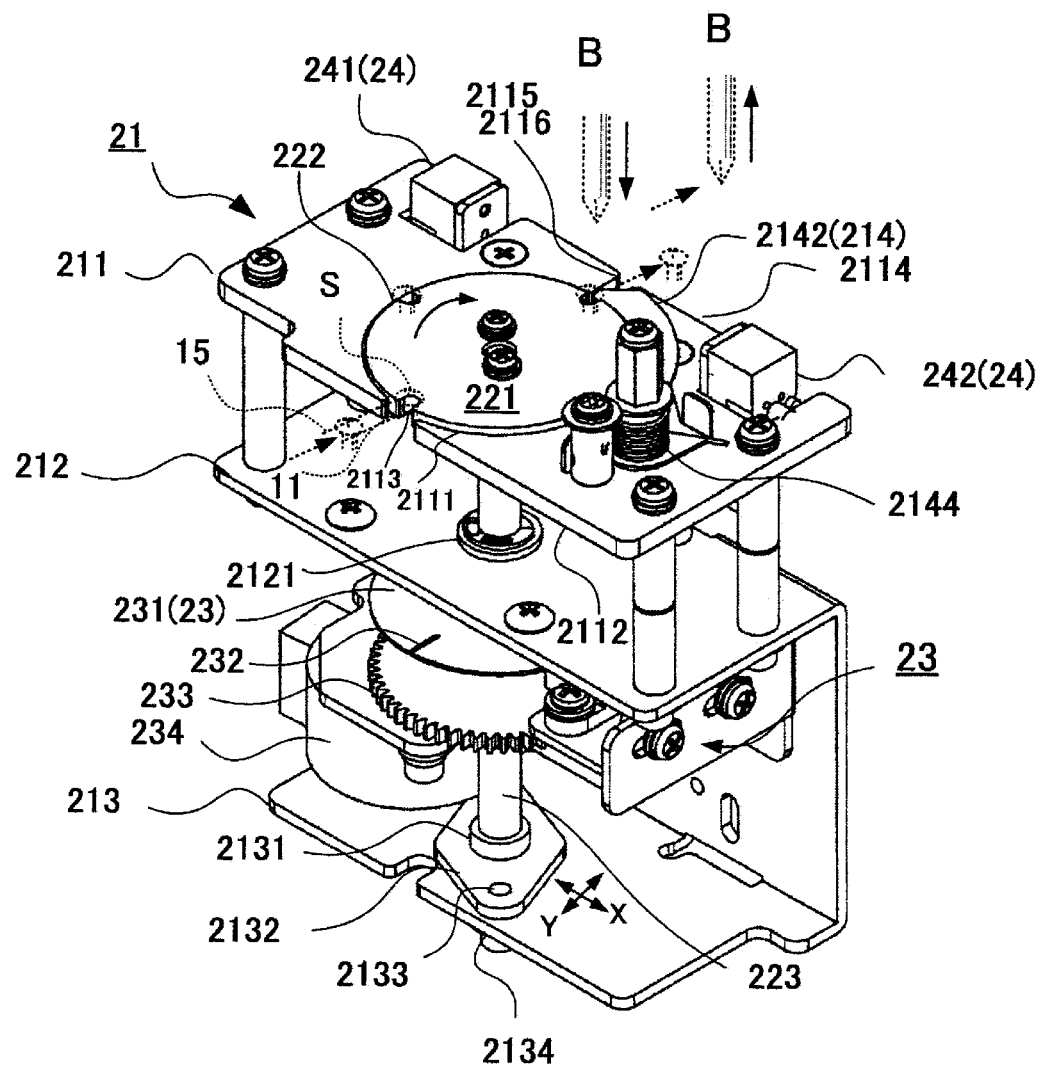

[FIG. 3]
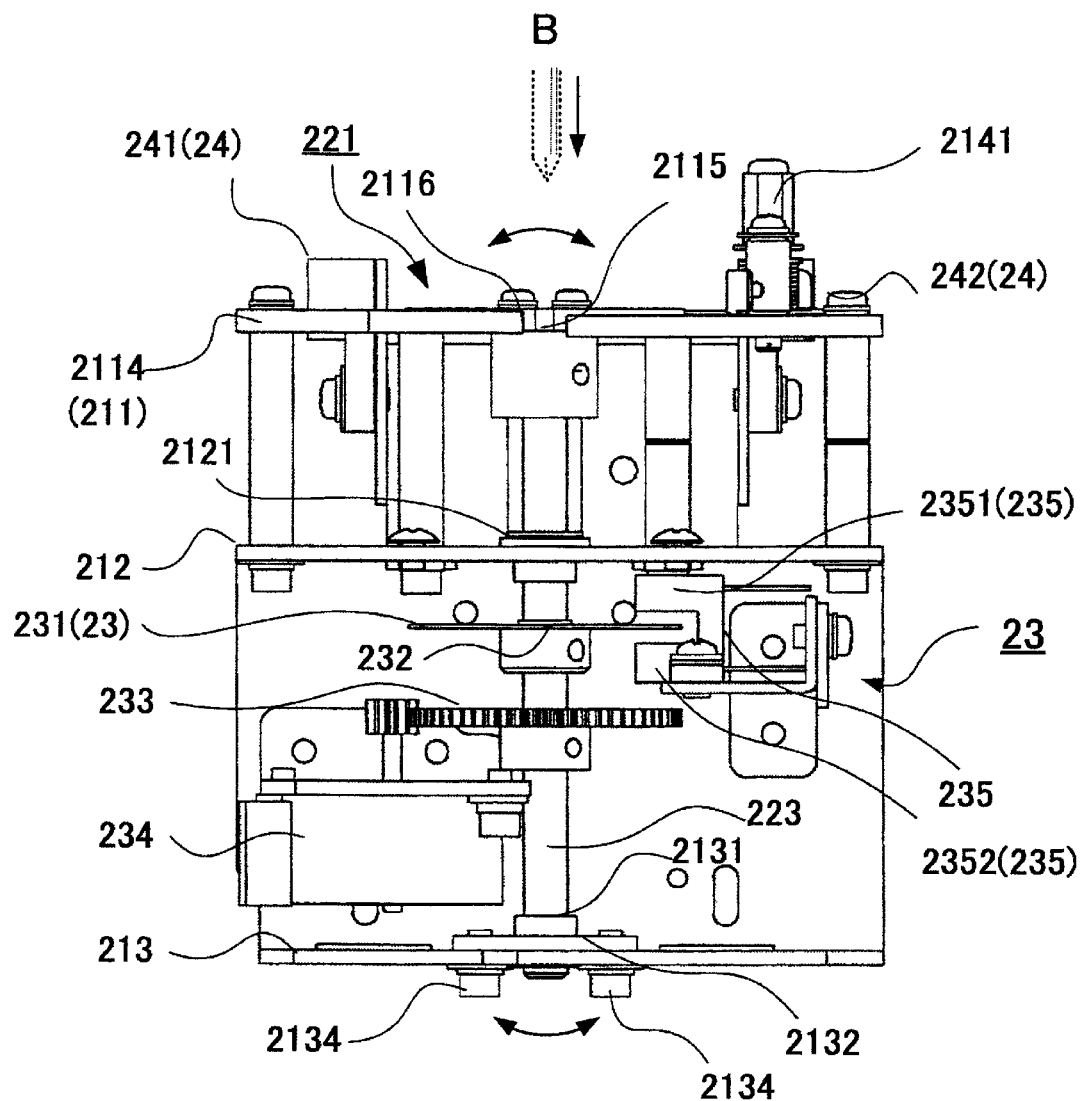

[FIG. 4]
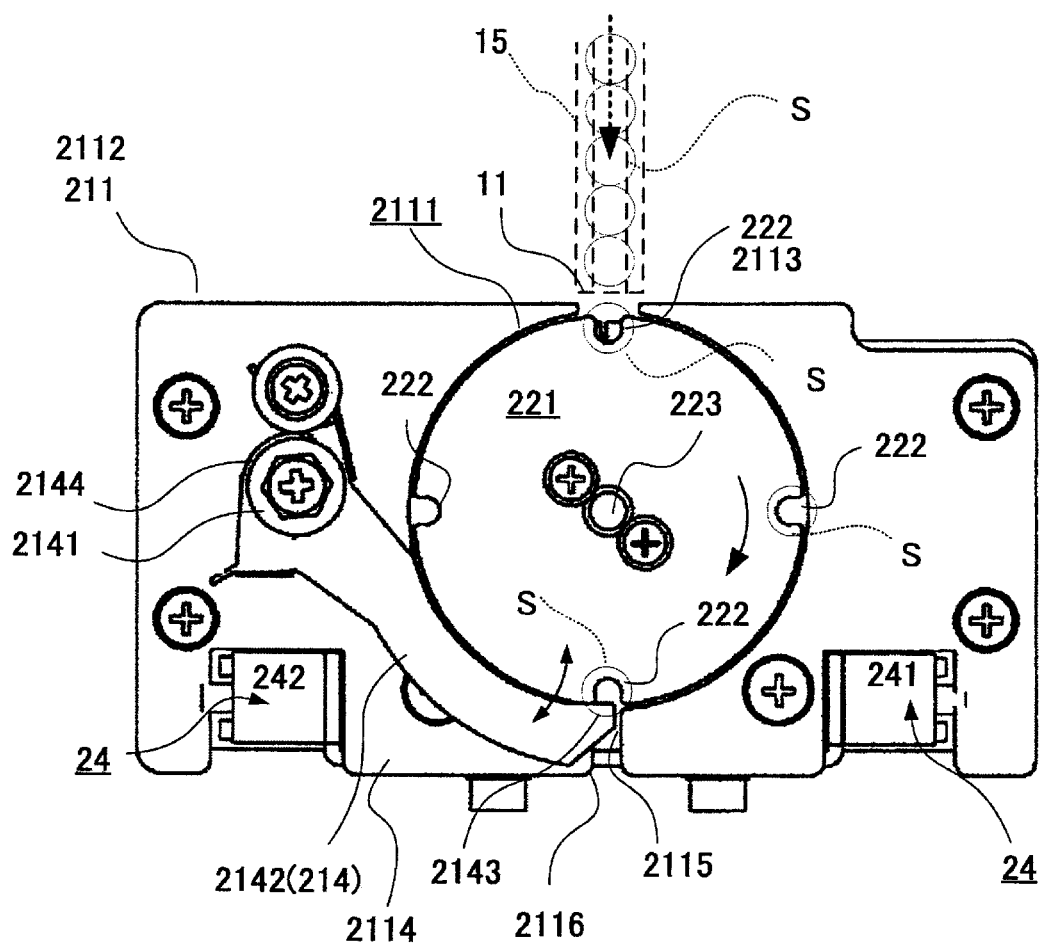

[FIG. 5]
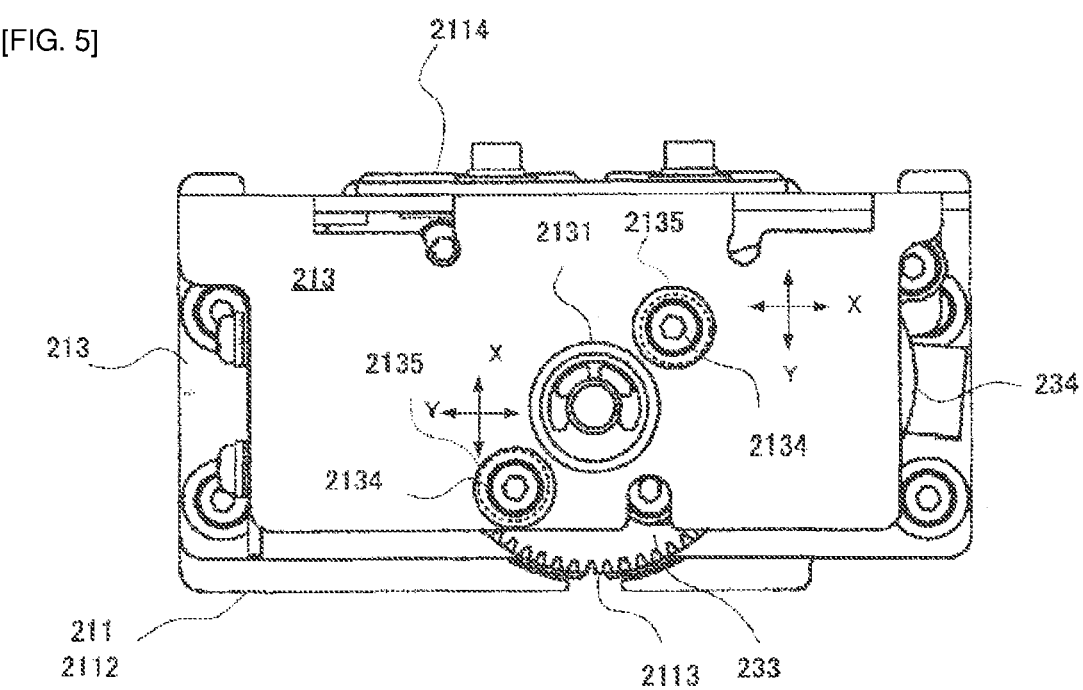

[FIG. 6]
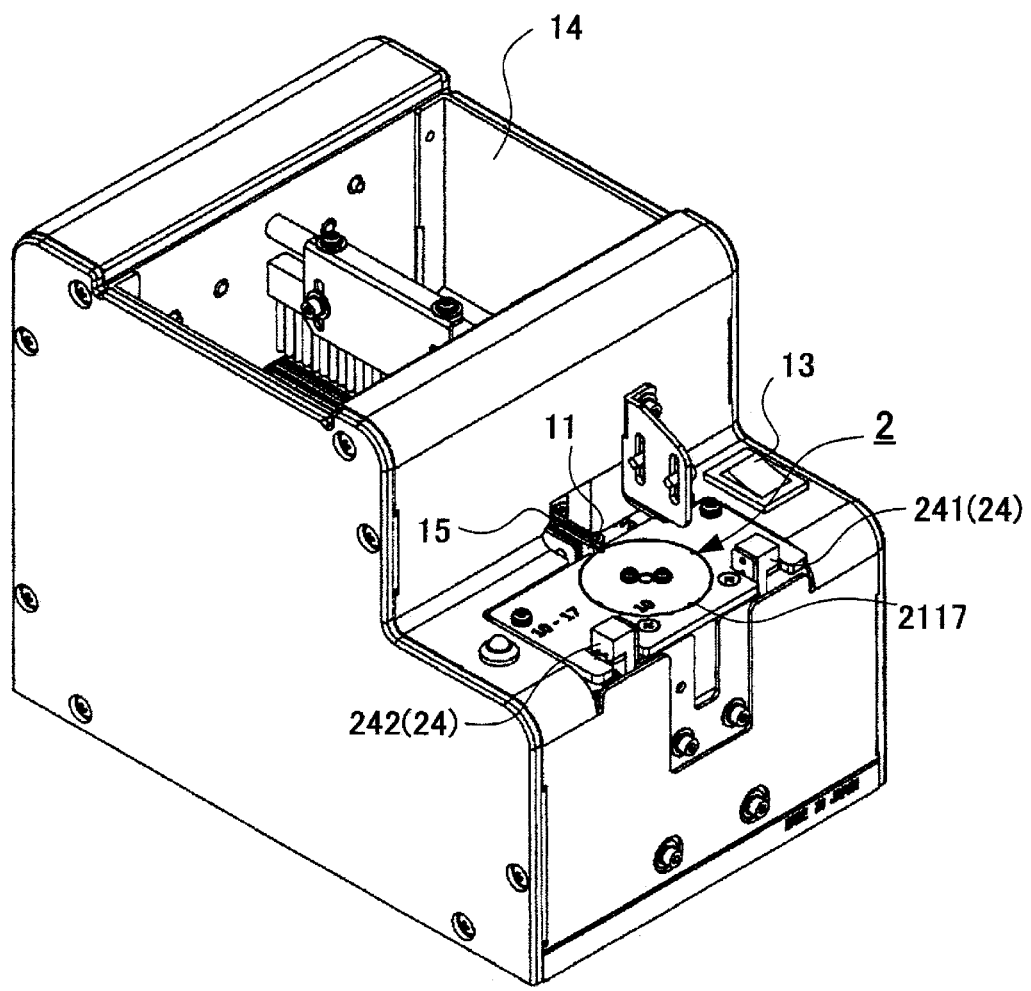

[FIG. 7]
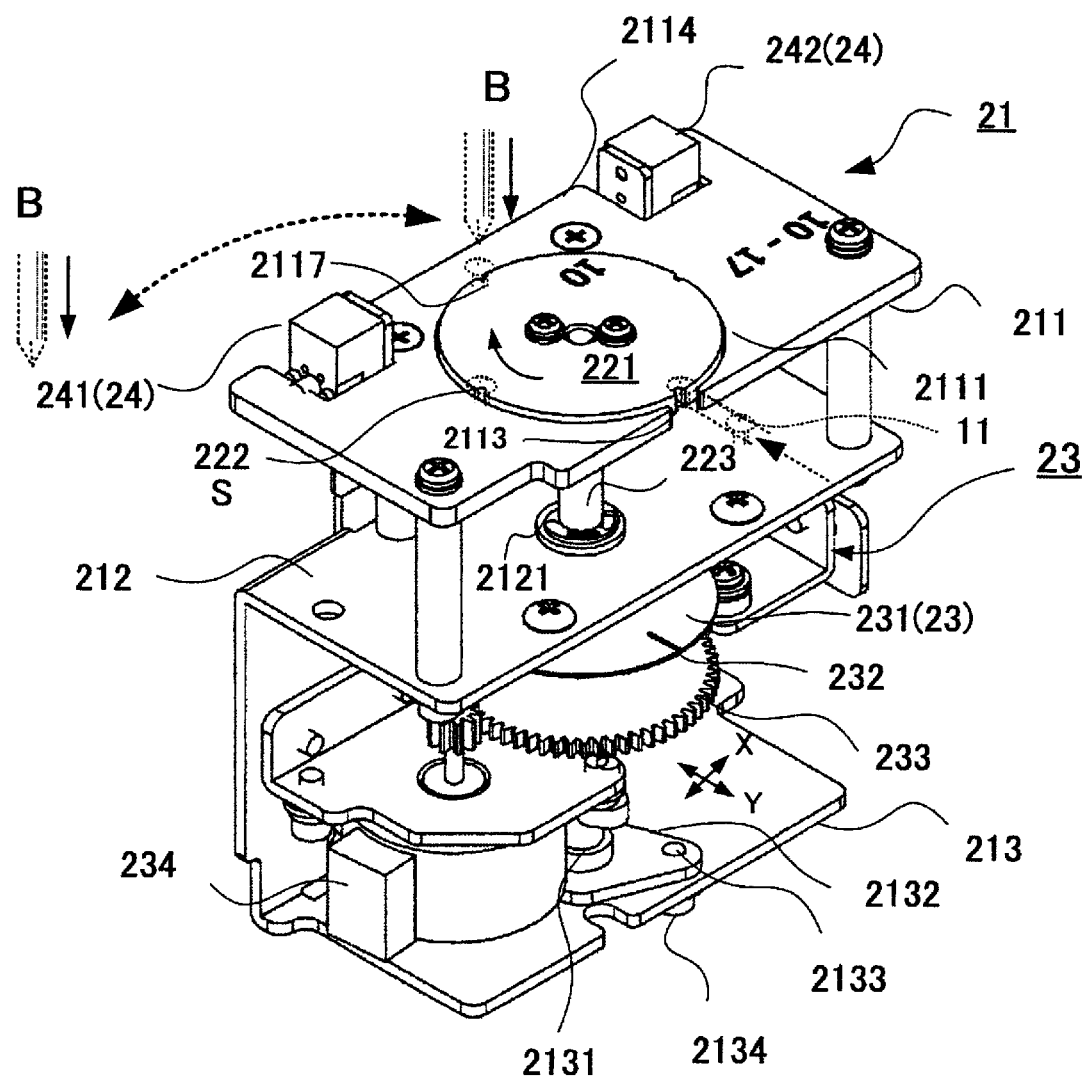

SCREW CUTTING MECHANISM FOR SCREW FEEDER

TECHNICAL FIELD

The present invention relates to a mechanism for cutting out or picking up screws one by one out of a screw feeding machine, more particularly to a cutting out mechanism having a horizontally rotating disk.

BACKGROUND TECHNOLOGY

Conventionally, in a screw feeding machine for supplying screws or screw-like parts continuously and automatically, each screw must be separated from following screws and is cut out or picked up, so that the picked-up screw can be attached to a desired body or part.

In a mechanism shown in Patent Document 1 (JP-A1-H8-155758), each screw is fed to an extracting position and is picked up directly by a tool or bit in a guide member arranged at the extracting position. This type mechanism has such a demerit that an alignment of screws is collapsed when the screw has a larger head or unique configuration.

In order to solve the above problem, it was proposed to cut out or pick up screws by a screws cutting-out mechanism having a reciprocal disk which is moved up and down and to and fro, as is shown in Patent Document 2 (JP-A1-2011-224712).

LIST OF KNOWN DOCUMENTS

Patent Documents

Patent document 1 JP-A1-H8-155758
Patent document 2 JP-A1-2011-224712
Patent document 3 JP-A1-H11-15667
Patent document 4 JP-A1-2011-208852

SUMMARY OF INVENTION

Problems to be Solved by the Invention

The known screws cutting out mechanism shown in Patent Document 2, however, has such a demerit that the picking up speed is limited and moving parts wear rapidly because the mechanism is based on a reciprocal motion of a disk.

The present invention was made in view of the above-mentioned problems.

An object of this invention is to provide a screw cutting out mechanism in which screws are displaced or advanced along only one direction.

Another object of this invention is to provide a screw cutting out mechanism in which the posture of screws are stabilized and a cutting out motion is precise and smooth, so that the screws are fed stably to a tool or driver bit.

Means to Solve the Problems

To solve the above-mentioned problem, an invention defied in claim 1 is a mechanism for cutting out screws one by one from a screw feeding machine, comprising a rotary disk which rotates horizontally and has recesses each for receiving a screw, the recesses being formed on an outer periphery of the rotary disk and opened toward a rotary shaft along a radial direction, the rotary disk being fitted in a circular cavity which is formed in an upper part of a frame, wherein the rotary shaft is secured to the rotary disk at the upper part of the frame, supported by a fixed bearing part arranged at an intermediate part of the frame and has an adjustable bearing unit arranged at a bottom part of the frame, a slit disk having slits corresponding to the recesses being positioned at suitable positions of the rotary shaft between the circular rotary disk and the adjustable bearing unit, a driving wheel being positioned at a suitable position of the rotary shaft between the rotary disk and the adjustable bearing unit, a detection mechanism for detecting positions of the slits of the slit disc, and a stepping motor for driving and rotating the driving wheel to one direction each at a predetermined angle, the stepping motor being controlled by a detection signal of the detection mechanism.

An invention defied in claim 2 is characterized in that the recesses are formed at equal intervals at the outer periphery of the rotary disk.

An invention defied in claim 3 is characterized in that four recesses are formed at a regular interval of 90 degree.

Advantages of the Invention

In the mechanism for cutting out screws for a screw feeder according to the present invention defied in claim 1, the horizontal rotary disk according to the present invention is driven only to one direction, so that an interval of screw feeding can be shortened in comparison with the known screw feeding machines in which a disk is driven by a reciprocal motion.

Still more, in the mechanism according to the present invention, the screw S does not run out or jumped out by an impact at sudden stop of the motion but can be separated certainly one by one, so that overlapping or entanglement of adjacent or successive screws can be avoided and the posture of screw S is stabilized, resulting in that a screw can be supplied to a driver tool or bit stably.

Moreover, a fixed bearing part is arranged at an intermediate position of the frame, so that the rotary disk can be secured easily at a position of the fixed bearing part. A adjustable bearing unit is arranged at the bottom position of the frame, so that precise centering of the rotary disk can be carried out by fine adjustment of the adjustable bearing unit in such a manner that an outer contour of the rotary disk does not contact with an inner wall of the circular cavity formed in an upper part of the frame.

Furthermore, even if an outlet of the screw feeder is located at such a position where a driver tool or bit B can't access easily, a screw take-out position can be changed to a front area of the screw cut-out mechanism and of the screw feeder, where the driver tool or bit B can access easily.

Moreover, the slits of the slit disk are formed at such angular positions that correspond to respective positions of the recesses in the rotary disk and hence the rotary disk and the slit disk are coaxial, so that respective stop positions of the rotary disk can be controlled precisely by the mechanism for detecting respective positions of the slits of the slit disc independently from the recess. Therefore, even when the rotary disk is jammed or clogged with screws S or even when the stepping motor is out of condition, the detection mechanism detects a position of slit of the slit disc so that the recess can be returned to its predetermined position.

In the mechanism for cutting out screws for a screw feeder according to the present invention defied in claims 2 and 3, the recesses are formed at equal intervals at the outer periphery of the rotary disk, so that screws can be supplied to the screw take-out positions and the screw feed can be synchronized efficiently with a motion of the tool or bit.

BRIEF DESCRIPTION OF THE DRAWINGS

FIG. 1 is a perspective view of a screw feeding machine 1 of Example 1 according to the present invention.

FIG. 2 is a perspective view of a screw cutting out mechanism 2 of the screw feeding machine illustrated in FIG. 1.

FIG. 3 is a front view of the screw feed mechanism 2 illustrated in FIG. 2.

FIG. 4 is a top view of the screw feed mechanism 2 illustrated in FIG. 2.

FIG. 5 is a bottom plan view the screw feed mechanism 2 illustrated in FIG. 2.

FIG. 6 is a perspective view of a screw feeding machine 1 of Example 2 according to the present invention.

FIG. 7 is a perspective view of a screw cutting out mechanism 2 of the screw feeding machine illustrated in FIG. 6.

MODE FOR CARRYING OUT THE INVENTION

The present invention provides a screw cutting out mechanism for cutting out and separating screws or their family such as eyelets one by one from a screw feeding machine which feeds the screws, so that the screw can be picked up by a driver which is manipulated by a worker or by a robot.

The screw cutting out mechanism according to the present invention can be integrated with the screw feeding machine. The screw cutting out mechanism according to the present invention has a rotary click which rotates to only one direction horizontally, so that a rotational speed of the rotary click can be increased and hence a screw cutting-out speed and a screw feeding speed can be elevated.

A term "screw" used in the present description should be understand that this term is not limited to screws but includes a family of screws such as eyelets.

Example 1

Now, the screw cutting out mechanism according to the present invention used in a screw feeding machine is described with referring to drawings attached.

FIG. 1 is a perspective view of a screw cutting out mechanism 2 according to Example 1 of the present invention which is integrated with a screw feeding machine 1. In operation, a switch 13 is turned ON and screws S are introduced or supplied into a charge opening 14 arranged at an upper part of the screw feeding machine 1. The screws S introduced into the opening 14 are aligned by an alignment mechanism (not shown) and are guided along an alignment rail 15, so that the screws S are supplied one by one successively out of an outlet 11 of the alignment rail 15.

Now, the screw cutting out mechanism 2 will be explained with referring to FIG. 2 to FIG. 5 which show Example 1 according to the present invention, in addition to FIG. 1.

As is shown in FIG. 2, a screw receiving station (FIG. 4: receiving recess 2113) of the screw cutting out mechanism 2 is positioned at the outlet 11 (See FIG. 1) of the alignment rail 15, so that screws S are fed one by one out of the outlet 11.

A bit guide member 12 (See FIG. 1) is secured to a front upper part of the screw feeding machine 1, so that a tool or a driver (hereinafter, bit B) is guided by the bit guide member 12 to a screw feeding station (feeding recess station, 2115) of the screw cutting out mechanism 2 and a screw S is taken out of the screw cutting out mechanism 2 by the bit B.

The screw feeding machine 1 can has any structure as long as it can align screws S and supply them one by one successively. Such screw feeding machines are known and can be the screw feeding machine shown in Patent Document 2.

Now, Example 1 of the screw cutting out mechanism 2 will be explained in details with referring to FIG. 1 to FIG. 5.

The screw cutting out mechanism 2 has a frame 21 comprising an upper frame part 211, an intermediate frame part 212 and a lower frame part 213. The rotary disk 221 is received in a circular cavity 2111 formed in the upper frame part 211. The rotary disk 221 is a principally member of the cutting out member 22 and a rotary shaft 223 thereof is supported by a fixed bearing part 2121 which is positioned at the intermediate frame part 212 and by an adjustable bearing unit 2131 arranged at the lower frame part 213, so that the rotary disk 221 rotates horizontally in the same plane as an upper surface of the upper frame part 211.

A recess 222 for receiving a screw S is formed on an outer periphery of the rotary disk 221 and opens toward the rotary shaft 223. A plurality of recesses 222 are positioned at equal intervals on an outer periphery of the rotary disk 221. In Example 1, four recesses 222 are at a regular interval of 90 degree.

The upper frame part 211 has a receiving recess 2113 for receiving a screw S on a side edge 2112 thereof. The receiving recess 2113 has a shape corresponding to a shape of the recess 222 of the rotary disk 221. On an opposite side edge 2114, the upper frame part 211 has a feeding recess station 2115 which provides a feed section for a tool or bit B. The feeding recess station 2115 has a shape corresponding to a shape of the recess 222 and has an outer opening 2116. To prevent dropping out of the screw S fed, a stopper 214 is arranged at the outer opening 2116.

As is shown in FIG. 4, the stopper 214 has an arm 2142 which is swingable about a pivot shaft 2141 and is biased by a sprig 2144 in such a manner that the screw S fed is pressed or held under a week force which prevent drop-out of the screw S and that, when a head of the tool or bit B is engaged with a head of the screw S and the tool or bit B is moved, a tip 2143 of the arm 2142 is swigged or retracted, so that the screw S can be taken out of the opening 2116 together with moving tool or bit B.

A screw detector 24 comprising paired light emitting element (diode) 241 and light receiving element (phototransistor) is arranged at opposite positions of the feeding recess station 2115 on the upper frame part 211 for detecting presence or absence of the screw S. Start and stop of a stepping motor 234 which will be mentioned later is controlled by a signal detected by the screw detector 24. In other words, a rotation of the stepping motor 234 is stopped when existence of the screw S is detected.

The rotary shaft 223 of the rotary disk 221 is supported at two journaling devices of a fixed bearing part 2121 which is positioned at the intermediate frame part 212 and of an adjustable bearing unit 2131 arranged at the lower frame part 213. The adjustable bearing unit 2131 is adjustably fixed to the lower frame part 213 in such a manner that its fitting position can be adjusted finely left and right and before and behind, so that the rotary disk 221 can rotate smoothly in the circular cavity 2111 formed in the upper frame part 211 without eccentricity. On the contrary, if the adjustable bearing unit 2131 is secured to a fixed position of the lower frame part 213, fine tuning of the rotary disk 221 can' be carried out when a delicate difference from a correct position of the rotary disk 221 occur due to a strain of the frame 21 or other reasons. By using the adjustable bearing unit 2131, the rotary disk 221 can be adjusted to a proper position during the final assembling stage. In fact, the rotary disk 221 can be centered so that an outer periphery of the rotary disk 221 doesn't contact with an inner surface of the circular cavity 2111 of the upper frame part 211 and hence the rotary disk 221 rotates smoothly.

In an embodiment, the adjustable bearing unit 2131 is integrated with a mounting member 2132 having two bolt receiving holes 2133. The lower frame part 213 has a pair of mounting holes 2135 each having a diameter which is a little bigger than a diameter of the bolt. Two bolts 2134 are inserted into the mounting holes 2135 from the bottom (FIG. 5) and are screwed to the bolt receiving holes 2133. Then, the bolts 2134 are tightened gradually while confirming a correct position of the rotary disk 221 and finally fastened. In FIG. 2 (FIG. 7) and FIG. 5, a bolt 2134 is movable in all directions in X-Y two-dimensions. A larger washer or the like can be inserted under a head of the bolt if necessary to prevent dropout of the bolts out of the mounting holes 2135 having a little bigger diameter.

Now, a mechanism 23 for stopping the rotary disk 221 at a predetermined position. A slit disc 231 and a driving gear 233 are secured coaxially to the rotary shaft 223 at a level between the adjustable bearing unit 2131 and the rotary disk 221, in an illustrated embodiment, between the fixed bearing part 2121 and the adjustable bearing unit 2131. The slit disc 231 has at least one narrow slit 232 extending toward the shaft. A position of narrow slit 232 corresponds to a position of the recess 222 of the rotary disk 221. The driving gear 233 is driven or rotated by a speed controlled stepping motor 234.

A detector mechanism 235 for detecting presence of the slit 231 of the slit disc 231 is arranged at the intermediate frame part 212 of the frame 21. The detector mechanism 235 has paired light emitting device 2351 (diode) and photo receiving unit (photo-transistor) 2352 at opposite positions upper and lower sides of the slit disc 231. When the screw feeding machine 1 is operated, the stepping motor 234 is controlled by a detection signal from the detector mechanism 235, so that the driving gear 233 is driven under the control of the stepping motor 234, and hence the rotary disk 221 is rotated unidirectionally at a predetermined angle. Therefore, even when the rotary disk 221 is chocked with a screw S and rotation stops and the stepping motor 234 loses synchronism, the detector mechanism 235 detects the slit 232 of the slit disc 231, so that the original location can be returned.

[Summary of Operation]

Now, how to feed or advance a screw S from the screw receiving station (receiving recess 2113) to the screw feed station (feeding recess station 2115) is explained with referring mainly FIG. 4 and FIG. 5.

When the switch 13 (FIG. 1) is turned ON, the rotary disk 221 is rotated and the mechanism 23 for stopping the rotary disk 221 (FIGS. 2, 3) detects the presence of slit 232. Rotation of the rotary disk 221 is stopped when a position of the recess 222 arrives at a position corresponding to a position of the receiving recess 2113 or the feeding recess station 2115.

Then, the screw detector 24 detects absence of any screw S at the feeding recess station 2115 of the screw cutting out mechanism 2 and the stepping motor 234 is driven by a detection signal of the screw detector 24. The receiving recess 2113 receives a screw S fed from the outlet 11 of the screw feeding machine 1. The screw S is received in the recess 222 of the rotary disk 221. The stepping motor 234 is driven until the screw S is advanced to the feeding recess station 2115 of the screw cutting out mechanism 2, so that the rotary disk 221 is rotated and stopped when the feeding recess station 2115 in which the screw S is received coincides with the recess 222.

At the feeding recess station 2115, a tool or bit B is guided to the bit guide member 12 (FIG. 1) and the screw S is cut out or takes out by an automatic driver handled by an operator manually. According to the present invention, the feeding recess station 2115 can be located at a position where the tool or bit B can access easily by using the rotary disk 221, even if the outlet 11 of the screw feeding machine 1 is located in such position where access of the tool or bit B is difficult. Namely, the feeding recess station 2115 is positioned at a front part of the screw cutting out mechanism 2 and of the screw feeding machine 1.

After the screw S is taken out, the screw detector mechanism 24 detects absence of screw S at the feeding recess station 2115 of the screw cutting out mechanism 2, and the rotary disk 221 is rotated until the mechanism 23 for stopping the rotary disk at a predetermined position detects the slit 232 (FIGS. 2, 3) and is stopped when the recess 222 coincides with the receiving recess 2113 and the feeding recess station 2115.

After this, the stepping motor 234 is driven and a screw S is newly received from the outlet 11 of the screw feeding machine 1 and is advanced to the receiving recess 2113. The screw S is received in the recess 222 of the rotary disk 221 and the stepping motor 234 is driven to rotate the rotary disk 221 until the screw S arrives at the feeding recess station 2115 of the screw cutting out mechanism 2. The rotary disk 221 is stopped when the recess 222 in which the screw S is stored coincides with the feeding recess station 2115. Thus, the above steps are repeated until the switch 13 is turn OFF. Thus, rotation the rotary disk 221 at each 90 degree is repeated continuously.

The screw cutting out mechanism for the screw feeding machine according to Example of the present invention has the above-mentioned structure and has following advantages.

In the cutting out mechanism 2 according to the present invention, the rotary disk 221 rotates horizontally, so that the posture of screw S is stabilized and hence the screw S can be fed stably to a driver, and screws S can be separated one by one certainly because the screw S moves up and down precisely and because the recesses 222 are formed at equal interval on outer periphery of the rotary disk 221 at 90 degree, so that blocking and overlapping of screws can be prevented and hence the posture of screw S is stabilized and the screw S can be fed stably to a driver bit. Supply of screw S to pick-up position can be synchronized effectively with a motion of the bit B.

Although the outlet 11 of the screw feeding machine 1 is located in such position where access of the tool or bit B is difficult, use of the rotary disk 221 permits to change a screw pick-up position to the front part of the screw cutting out mechanism 2 and of the screw feeding machine 1, where the tool or bit B can access easily. Since an upper surface of the rotary disk 221 is horizontal, the screw feeding section (feeding recess station 2115) can be located at any position on an outer periphery of the rotary disk 221 apart from the outlet 11.

Furthermore, the fixed bearing part 2121 is located at the intermediate frame part 212 of the frame 21 at a middle level, so that rotary shaft 223 can be held easily at a position of the fixed bearing part 121. The adjustable bearing unit 2131 whose position is adjustable is arranged at lower frame part 213 of the frame 21 at a lower level, so that a position of the rotary disk 221 located at an upper level of the frame object 21 can be tuned finely. Thus, the rotary disk 221 is centered precisely in such a manner that an outer contour of the rotary disk 221 does not contact with an inner wall of the circular recess 2111, and then is secured an exact position.

The slit disc 231 having the slits 232 each corresponds to the recess 222 of the rotary disk 221 is secured to rotary shaft 223 coaxially with the rotary disk 221 and positions of the slits 232 is detected by the detector mechanism 235. Therefore, it is possible to control that the recess 222 of the rotary disk 221 stops at a predetermined position exactly according to a signal from the detector mechanism 235 in any case.

Example 2

Now, Example 2 of the screw cutting out mechanism for a screw feeding machine according to the present invention is explained with referring FIG. 6 and FIG. 7.

Example 2 is different from Example 1 in such a point that the feeding recess station 2115, the stopper 214 and the bit guide member 12 used in Example 1 are not used in Example 2 but other features are same as Example 1. Here, explanation of Example 1 which is applicable also to Example 2 is not repeated.

In Example 2, the screw feed section 2117 is stopped at a predetermined position, in Example 2, near to the side edge 2114 which is remote from the receiving recess 2113. When the rotary disk 221 is rotated, a screw S received in the recess 222 of the rotary disk 221 is conveyed to the predetermined position and stops there where the screw S is engaged with or picked up by a bit B of a driver manipulated by a robot (not shown) or the like. The screw S picked up by the robot is conveyed to a predetermined assembling station in which the screw S is screwed into a screw hole of an object to be assembled.

In this case, movement of the bit B is controlled by an automatic programming and the position where the bit B engages with the screw S is fixed, so that the feeding recess station 2115, the stopper 214 and the bit guide member 12 are not necessary.

Advantages and effect of the screw cutting out mechanism of the screw feeding machine in Example 2 are identical with those of example 1 and hence they are not repeated here.

The present invention is not limited to Example 1 and Example 2 mentioned above but covers all variations of course, unless features of the present invention are not spoiled. For example, in the Examples, the screw receiving recess part is arranged at an angular position of 180 degrees from the feeding recess part and the feed section. However, it is possible to design such that a recess of the rotary disk coincides with the feeding recess part or feed section for a preceding screw S during when a recess of the rotary disk coincides with the receiving recess for a following screw S. In the Examples, the rotary disk has 4 recesses on its outer periphery at a regular angular interval of 90 degree. However, it is possible to arrange 8 recesses at a regular angular interval of 45 degree, or more recesses. Only 2 recesses may be sufficient.

REFERENCE NUMBER

S Screws or its family
B Bit
1 Screw feeder
11 Outlet
12 Bit guide member
13 (start) Switch
14 Charging opening
15 Alignment rail
2 Screw cutting out mechanism
21 Frame
211 Upper frame part
2111 Circular cavity
2112 (one side) A side edge
2113 Receiving recess station,
2114 (another side) A side edge,
2115 Feeding recess station (screw feeding station),
2116 Outer opening,
2117 Screw feed section (Example 2),
212 Intermediate frame part,
2121 Fixed bearing part,
213 Lower frame part,
2131 Adjustable bearing unit,
2132 Mounting member,
2133 Bolt receiving holes,
2134 Bolt,
2135 Mounting hole
214 Stopper,
2141 Pivot shaft
2142 Arm,
02143 Tip,
2144 Spring,
22 Cutting out member,
221 Rotary disk,
222 Recess,
223 Rotary shaft,
23 Mechanism for stopping at a predetermined position,
231 Slit disc,
232 Slit
233 Drive gear
234 Stepping motor,
235 (positioning) Detector mechanism,
2351 Light emitting device,
2352 Photo receiving unit,
24 A screw detector mechanism,
241 Light emitting element,
242 Photo receiving element

The invention claimed is:

1. A mechanism for cutting out screws one by one from a screw feeding machine, comprising
a rotary disk which rotates horizontally and has recesses each for receiving a screw, said recesses being formed on an outer periphery of said rotary disk and opened toward a rotary shaft along a radial direction,
said rotary disk being fitted in a circular cavity which is formed in an upper part of a frame,
wherein said rotary shaft is secured to said rotary disk at the upper part of said frame, supported by a fixed bearing part arranged at an intermediate part of said frame and has an adjustable bearing unit arranged at a bottom part of said frame,
said adjustable bearing unit being integrated with a mounting member having two bolt receiving holes,
a lower part of the frame having a pair of mounting holes each having a diameter slightly larger than a diameter of the bolt and configured to adjust a position of the rotary disk by adjusting a position of the adjustable bearing in said radial direction,
wherein the mounting member is attached to the lower part of the frame with two bolts inserted into the pair of mounting holes from a side of the lower part of the frame opposite the mounting member and are screwed into the bolt receiving holes, in such a manner the rotary disk can rotate smoothly in the circular cavity formed in the upper frame part without eccentricity, a slit disk having slits corresponding to said recesses being positioned at a suitable positions of said rotary shaft between said circular rotary disk and said adjustable bearing unit, a driving wheel being positioned at a suitable position of said rotary shaft between said rotary disk and said adjustable bearing unit, a detection mechanism for detecting positions of said slits of said slit disc, a stepping motor for driving and rotating said driving wheel to one direction intermittently each at a predetermined angle, said stepping motor being controlled by a detection signal of said detection mechanism, and a screw detector for detecting presence or absence of the screw arranged at the recess which receives the screw, so that start and stop of the stepping motor is controlled by a signal detected by the screw detector.

2. The mechanism for cutting out screws according to claim 1, in which said recesses are formed at equal intervals at the outer periphery of said rotary disk.

3. The mechanism for cutting out screws according to claim 2, in which four recesses are formed at a regular interval of 90 degree.

4. The mechanism for cutting out screws according to claim 1, further comprising a stopper comprising an arm swingably mounted with a biasing member at a first end to the upper part of the frame and having a tip disposed at another end, the biasing member biasing the arm to press the tip against the screw arranged in the recess.

* * * * *